B. WEBER.
STEAMER ATTACHMENT FOR BOILERS.
APPLICATION FILED DEC. 10, 1912.
1,083,783. Patented Jan. 6, 1914.
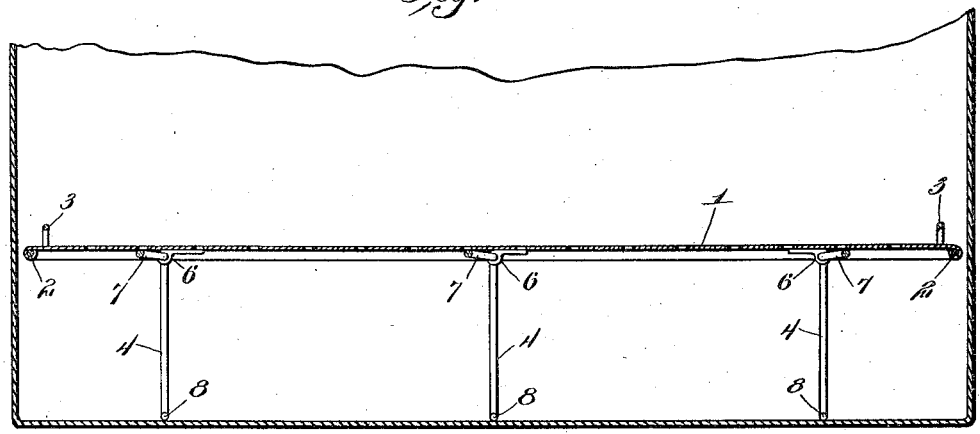
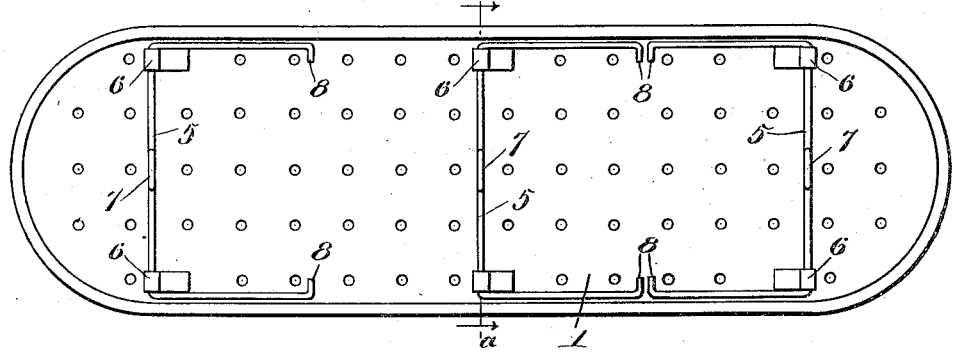
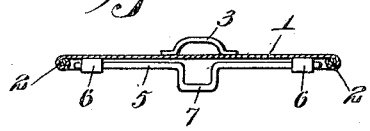
Inventor
Bertha Weber
Witnesses
By Victor J. Evans
Attorney

UNITED STATES PATENT OFFICE.

BERTHA WEBER, OF PORTOLA, CALIFORNIA.

STEAMER ATTACHMENT FOR BOILERS.

1,083,783.  Specification of Letters Patent.  Patented Jan. 6, 1914.

Application filed December 10, 1912. Serial No. 735,880.

*To all whom it may concern:*

Be it known that I, BERTHA WEBER, a citizen of the United States, residing at Portola, in the county of Plumas and State of California, have invented new and useful Improvements in Steamer Attachments for Boilers, of which the following is a specification.

This invention relates to improvements in culinary steamers and especially with reference to improvements in steamer attachments for use in connection with wash boilers and other vessels to enable a wash boiler or other like vessel to be also used for steaming hams and other articles and also for canning and preserving, the invention consisting in the construction, combination and arrangement of parts set forth in and falling within the scope of the appended claim.

In the accompanying drawing:—Figure 1 is a longitudinal sectional view of a portion of a boiler provided with my improved steamer attachment, showing the steamer attachment set up for use in the bottom of the boiler. Fig. 2 is an inverted plan of my improved steamer attachment. Fig. 3 is a transverse sectional view of the same on the plane indicated by the line *a—a* of Fig. 2.

In accordance with my invention, I provide a perforated steamer plate 1 which may be made of any suitable material, sheet metal or the like, and which is of a size and shape adapting it to be placed in the bottom of a wash boiler, kettle or other vessel. This perforated steamer plate is here shown as provided with reinforcing wires 2 which extend around its edges. At the ends or at opposite sides of the steamer plate are loop-shaped handles 3 to facilitate lifting and handling the device. On the under side of the steamer plate and preferably near the ends thereof are pairs of supporting legs 4. The members of each pair of supporting legs are formed integrally with and bent from a cross bar or shaft 5 which is mounted in bearing clips 6 on the under side of the steamer plate so that the legs may be folded against the bottom of the steamer plate out of the way or may be turned to a vertical position and extended downwardly from the steamer plate to bear on the bottom of the boiler or other vessel and serve to support the steamer plate at a suitable distance above the bottom of said vessel. In order to hold the supporting legs in supporting position, I provide the cross bar or shaft 5 of each pair of supporting legs with a crank-shaped arm 7 which is at right angles to the supporting legs and bears against the bottom of the steamer plate when the supporting legs are in vertical position. The free ends of the supporting legs are here shown as inturned to provide feet 8 to bear on the bottom of the vessel.

My improved steamer attachment may be made of any size and shape to fit and for use in connection with any kind of vessel and I would have it understood that I am not limited in this particular.

While I have herein shown and described a preferred form of the invention, I would have it understood that changes may be made in the form, proportion and construction of the several parts without departing from the spirit of my invention and within the scope of the appended claim.

I claim:—

The herein described steamer attachment for boilers and other like vessels, comprising a plate for arrangement in the vessel and above the bottom thereof, and supporting legs for the said steamer plate, each of the said supporting legs being substantially U-shaped and having a cross bar or shaft provided with a centrally arranged crank shaped arm at right angles to the supporting legs, the said supporting legs being provided with inturned feet to bear on the bottom of the vessel, and clips on the bottom of the steamer plate and forming bearings for the cross bars or shafts of the supporting legs.

In testimony whereof I affix my signature in presence of two witnesses.

BERTHA WEBER.

Witnesses:
  W. A. LEAR,
  ALICE DONNENWIRTH.

Copies of this patent may be obtained for five cents each, by addressing the "Commissioner of Patents, Washington, D. C."